United States Patent
Bisarya et al.

(10) Patent No.: US 10,212,119 B2
(45) Date of Patent: Feb. 19, 2019

(54) METHOD AND SYSTEM FOR ENABLING MESSAGING BETWEEN USERS

(71) Applicants: Pooja Bisarya, San Diego, CA (US);
Priya Jain, Los Altos, CA (US);
Lakshya Jain, Los Altos, CA (US);
Priya Bisarya, San Diego, CA (US);
Robin Bisarya, San Diego, CA (US);
Dave Marvit, San Francisco, CA (US);
Jeff Ubois, Chicago, IL (US)

(72) Inventors: Pooja Bisarya, San Diego, CA (US);
Priya Jain, Los Altos, CA (US);
Lakshya Jain, Los Altos, CA (US);
Priya Bisarya, San Diego, CA (US);
Robin Bisarya, San Diego, CA (US);
Dave Marvit, San Francisco, CA (US);
Jeff Ubois, Chicago, IL (US)

(*) Notice: Subject to any disclaimer, the term of this patent is extended or adjusted under 35 U.S.C. 154(b) by 98 days.

(21) Appl. No.: 14/994,147

(22) Filed: Jan. 13, 2016

(65) Prior Publication Data
US 2017/0201481 A1    Jul. 13, 2017

(51) Int. Cl.
H04L 12/58    (2006.01)
H04L 29/08    (2006.01)

(52) U.S. Cl.
CPC .......... H04L 51/26 (2013.01); H04L 51/24 (2013.01); H04L 67/306 (2013.01)

(58) Field of Classification Search
CPC .......... H04L 29/08072; H04L 29/06; H04L 29/08135; H04L 29/08648; H04L 29/08981; G06F 3/04855; G06F 3/0485; G06F 3/04847; G06F 3/0481; G06F 3/0483
USPC .......................................................... 709/202
See application file for complete search history.

(56) References Cited

U.S. PATENT DOCUMENTS

| | | | |
|---|---|---|---|
| 7,770,130 B1* | 8/2010 | Kaptelinin | G06F 3/04855 715/251 |
| 2007/0011367 A1* | 1/2007 | Scott | G06Q 10/10 710/48 |
| 2014/0096167 A1* | 4/2014 | Lang | H04N 21/4788 725/91 |
| 2014/0164476 A1* | 6/2014 | Thomson | G06Q 10/101 709/203 |
| 2014/0244712 A1* | 8/2014 | Walters | H04L 67/10 709/202 |

(Continued)

*Primary Examiner* — Mahran Y Abu Roumi
(74) *Attorney, Agent, or Firm* — Thibault Patent Group

(57) ABSTRACT

The present disclosure provides a method and system for enabling conversation between one or more users through one or more messages. The computer-implemented method includes a reception of the one or more messages on a communication device. The communication device is associated with the user of the one or more users. Further, the computer-implemented method includes a determination of a level of urgency. The level of urgency is associated with each of received one or more messages in real time. Furthermore, the computer-implemented method includes conveying of a determined level of urgency. The determined level of urgency is associated with the one or more messages of the user of the one or more users in the real time. Moreover, the computer-implemented method includes reverting to the message of the one or more messages having the highest level of urgency.

18 Claims, 5 Drawing Sheets

(56) References Cited

U.S. PATENT DOCUMENTS

2014/0379813 A1\* 12/2014 Charania ................. H04L 51/02
                                                    709/206
2016/0259638 A1\*  9/2016 El Maghraoui ..... G06F 17/2785
2017/0171124 A1\*  6/2017 Brezina ................. G06Q 10/107
2017/0180294 A1\*  6/2017 Milligan ................. H04L 51/16

\* cited by examiner

METHOD AND SYSTEM FOR ENABLING MESSAGING BETWEEN USERS

TECHNICAL FIELD

The present invention relates to the field of machine learning based messaging and, in particular, relates to a system for providing a hands-free messaging between one or more users.

BACKGROUND

In the recent years, the use of messaging applications has dramatically increased. These messaging applications include voice messaging, short text messaging, instant messaging, electronic mail, RSS clients, blogging, micro-blogging and the like. The messaging applications have become a cost efficient way of communicating with individuals having busy schedules. A particular individual receives a lot of messages from clients, co-workers, family members, advertisers, friends and the like. The individual may or may not have time, ability or inclination to read all the urgent messages. Traditionally, answering machines record voicemail messages and play them back in a sequential manner.

Conventionally, the individual listens to each message sequentially to determine if a message is urgent or not. This can be very time consuming for a busy individual. With numerous amounts of messages in the portable devices, finding messages of interest is a tedious task, especially under time constraints. The individual may not be able to reply or read the urgent messages while driving. Therefore, there exists a need for techniques that can effectively categorize the messages based on their urgency and provide a hands free method of reverting back to the same message.

In U.S. patent application Ser. No. 11/770,921, an automated voice message or caller prioritization system that extracts words, prosody or metadata from a voice input is provided. The data extracted is classified with a statistical classifier into groups of interest. These groups could indicate the likelihood that a call is urgent versus non urgent, from someone the user knows well versus someone that the user only knows casually or not at all, from someone using a mobile phone versus a landline, or a business call versus a personal calls. The system then can determine an action based on results of the groups, including the display of likely category labels on the message. Call handling and display actions can be defined by user preferences.

The conventional methods and prior art are found to be inefficient in categorizing messages based on their urgency. These prior arts rely completely on a priority set manually by user. In addition, these methods don't take into account a multitude of situations where an urgent message may go unnoticed. These situations include any medical emergency, any business related message, client's message, driving and sleeping. In addition, these prior art rely on conventional vibration pattern and tones to alert the individual about any message. The individual may not be able to distinguish the urgent message from the less important message as both will generate the same vibrational pattern and tone.

In light of the above stated discussion, there is a need for a method and system which overcomes the above stated disadvantages.

SUMMARY

In an aspect, the present disclosure provides a computer-implemented method for enabling conversation between one or more users through one or more messages. The computer-implemented method includes a reception of the one or more messages on a communication device with a processor. The communication device is associated with the user of the one or more users. Further, the computer-implemented method includes a determination of a level of urgency with the processor. The level of urgency is associated with each of received one or more messages in a real time. Furthermore, the computer-implemented method includes conveying of a determined level of urgency with the processor. The determined level of urgency is associated with the one or more messages of the user of the one or more users in the real time. Moreover, the computer-implemented method includes reverting to the message of the one or more messages having the highest level of urgency with the processor. Further, each of the one or more messages is received in real time. Furthermore, the level of urgency is determined from an analysis of each of one or more received messages. The analysis of each of the one or more received messages is done based on a mining of sentiments associated with each of the one or more messages. In addition, the analysis of each of the one or more received messages is done based on a user profile associated with the user of the one or more users. The user profile is based on a plurality of parameters. Moreover, the conveying of the determined level of urgency is done to prompt the user about a message of the one or more messages having a highest level of urgency. The conveying of the determined level of urgency is done the analysis of the one or more messages. The level of urgency is conveyed through a first plurality of techniques. Further, the reverting to the message of the one or more messages having a high level of urgency is done based on a preference set by the user. The reverting to the message of the one or more messages is done through a second plurality of techniques.

In an embodiment of the present disclosure, the computer-implemented method further comprises setting of a priority level associated with each of the one or more received messages with the processor. The priority level is set based on the determined level of urgency. Moreover, the priority is set by ordering, ranking and filtering the one or more messages and the one or more users based on the level of urgency and determining one or more behavioral attributes of one or more users. The one or more behavioral attributes comprises a measure of urgency for the user and a frequency of sending of urgent messages of the one or more messages.

In an embodiment of the present disclosure, the computer-implemented method further includes an update of the plurality of parameters associated with the user and the user profile with the processor.

In an embodiment of the present disclosure, the computer-implemented method further includes a calibration of the user profile with the processor. The calibration of the user profile is based on monitoring a real time variation in the plurality of parameters.

In an embodiment of the present disclosure, the computer-implemented method further includes generation of a speech processing based auto response and an auto notification of relevant device measurements with the processor.

In an embodiment of the present disclosure, the plurality of parameters includes a past interaction of the user of the one or more users with a corresponding sender and a past interaction of the user with a group of senders. Further, the plurality of parameters includes preference settings of the user of the one or more users, a number of messages associated with each corresponding sender and duration of messaging associated with each of the corresponding sender.

In addition, the plurality of parameters includes a time period associated with a conversation with each of the corresponding sender, an identity of sender, a mapping of trigger words and a variation in typing.

In an embodiment of the present disclosure, the one or more messages includes but is not limited to one or more text messages, one or more e-mail messages, one or more audio messages, one or more video messages and one or more multimedia messages.

In an embodiment of the present disclosure, the first plurality of techniques includes one or more frequency changes in one or more vibratory pulses and an increase in amplitude of the one or more vibratory pulses. In addition, the first plurality of techniques includes a range of vibration patterns in the preference settings, a color coded pattern, one or more audio feedbacks, one or more haptic feedbacks and a text to speech feedback. The range of vibration pattern is set based on at least one of a user preference and a default configuration. The text to speech feedback includes a portion of text from each of the one or more messages conveying urgency.

In an embodiment of the present disclosure, the color coded pattern is based on a pattern of hue, saturation and color of text in each of the one or more messages.

In an embodiment of the present disclosure, the second plurality of techniques includes a speech to text feedback, a speech based message editing and scrolling, a face gesture based sentiment recognition and a speech tone based sentiment recognition. In addition, the second plurality of techniques includes a mapping of keywords in a text converted from the speech to the text.

In another aspect, the present disclosure provides a computer program product. The computer program product includes a non-transitory computer readable medium. The non-transitory computer readable programs store a computer readable program. The computer readable program when executed on a computer causes the computer to perform one or more steps. The one or more steps include a reception of the one or more messages on a communication device. The communication device is associated with the user of the one or more users. Further, the one or more steps include a determination of a level of urgency. The level of urgency is associated with each of received one or more messages in a real time. Furthermore, the one or more steps include conveying of a determined level of urgency. The determined level of urgency is associated with the one or more messages of the user of the one or more users in the real time. Moreover, the one or more steps include reverting to the message of the one or more messages having the highest level of urgency. Further, each of the one or more messages is received in real time. Furthermore, the level of urgency is determined from an analysis of each of one or more received messages. The analysis of each of the one or more received messages is done based on a mining of sentiments associated with each of the one or more messages. In addition, the analysis of each of the one or more received messages is done based on a user profile associated with the user of the one or more users. The user profile is based on a plurality of parameters. Moreover, the conveying of the determined level of urgency is done to prompt the user about a message of the one or more messages having a highest level of urgency. The conveying of the determined level of urgency is done the analysis of the one or more messages. The level of urgency is conveyed through a first plurality of techniques. Further, the reverting to the message of the one or more messages having a high level of urgency is done based on a preference set by the user. The reverting to the message of the one or more messages is done through a second plurality of techniques.

In an embodiment of the present disclosure, the computer readable program when executed on the computer causes the computer to set a priority level associated with each of the one or more received messages with the processor. The priority level is set based on the determined level of urgency. Moreover, the priority is set by ordering, ranking and filtering the one or more messages and the one or more users based on the level of urgency and determining one or more behavioral attributes of one or more users. The one or more behavioral attributes comprises a measure of urgency for the user and a frequency of sending of urgent messages of the one or more messages.

In an embodiment of the present disclosure, the computer readable program when executed on the computer causes the computer to update the plurality of parameters associated with the user and the user profile.

In an embodiment of the present disclosure, the computer readable program when executed on the computer causes the computer to calibrate the user profile based on monitoring a real time variation in the plurality of parameters.

In an embodiment of the present disclosure, the computer readable program when executed on the computer causes the computer to generate a speech processing based auto response and an auto notification of relevant device measurements.

In yet another aspect, the present disclosure provides an interactive messaging system for enabling a conversation between one or more users through one or more messages. The interactive messaging system includes a receiving module in a processor. The receiving module receives the one or more messages on a communication device associated with the user of the one or more users. Further, the interactive messaging system includes a determination module in the processor. The determination module determines a level of urgency associated with each of the received one or more messages in real time. Furthermore, the interactive messaging system includes a conveying module in the processor. The conveying module conveys a determined level of urgency associated with the one or more messages to the user of the one or more users in real time. In addition, the interactive messaging system includes a reverting module in the processor. The reverting module reverts to the message of the one or more messages with the highest level of urgency. Further, each of the one or more messages is received in real time. Furthermore, the level of urgency is determined from an analysis of each of one or more received messages. The analysis of each of the one or more received messages is done based on a mining of sentiments associated with each of the one or more messages. In addition, the analysis of each of the one or more received messages is done based on a user profile associated with the user of the one or more users. The user profile is based on a plurality of parameters. Moreover, the conveying of the determined level of urgency is done to prompt the user about a message of the one or more messages having a highest level of urgency. The conveying of the determined level of urgency is done the analysis of the one or more messages. The level of urgency is conveyed through a first plurality of techniques. Further, the reverting to the message of the one or more messages having a high level of urgency is done based on a preference set by the user. The reverting to the message of the one or more messages is done through a second plurality of techniques.

In an embodiment of the present disclosure, the interactive messaging system further includes a setting module in the processor. The setting module is configured to set a priority level associated with each of the one or more received messages with the processor. The priority level is set based on the determined level of urgency. Moreover, the priority is set by ordering, ranking and filtering the one or more messages and the one or more users based on the level of urgency and determining one or more behavioral attributes of one or more users. The one or more behavioral attributes comprises a measure of urgency for the user and a frequency of sending of urgent messages of the one or more messages.

In an embodiment of the present disclosure, the interactive messaging system further includes an updating module in the processor. The updating module updates the plurality of parameters associated with the user and the user profile.

In an embodiment of the present disclosure, the interactive messaging system further includes a calibration module in the processor. The calibration module calibrates the user profile based on monitoring a real time variation in the plurality of parameters. The plurality of parameters includes a past interaction of the user of the one or more users with a corresponding sender and a past interaction of the user with a group of senders. Further, the plurality of parameters includes preference settings of the user of the one or more users, a number of messages associated with each corresponding sender and duration of messaging associated with each of the corresponding sender. In addition, the plurality of parameters includes a time period associated with a conversation with each of the corresponding sender, an identity of sender, a mapping of trigger words and a variation in typing.

In an embodiment of the present disclosure, the interactive messaging system further includes a generation module in the processor. The generation module generates a speech processing based auto response and auto notification of relevant device measurements.

BRIEF DESCRIPTION OF THE FIGURES

Figure 1A:
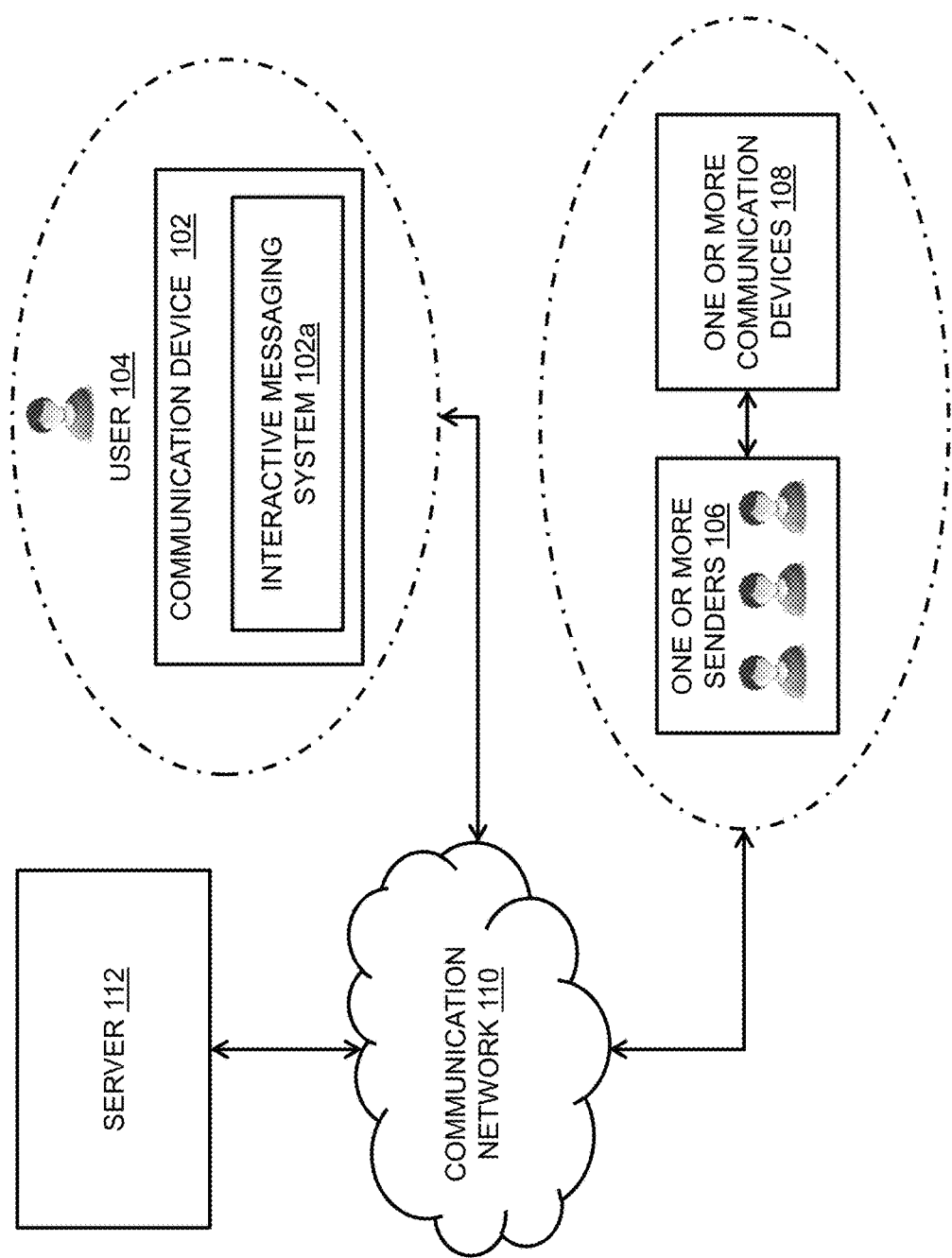
Figure 1B:
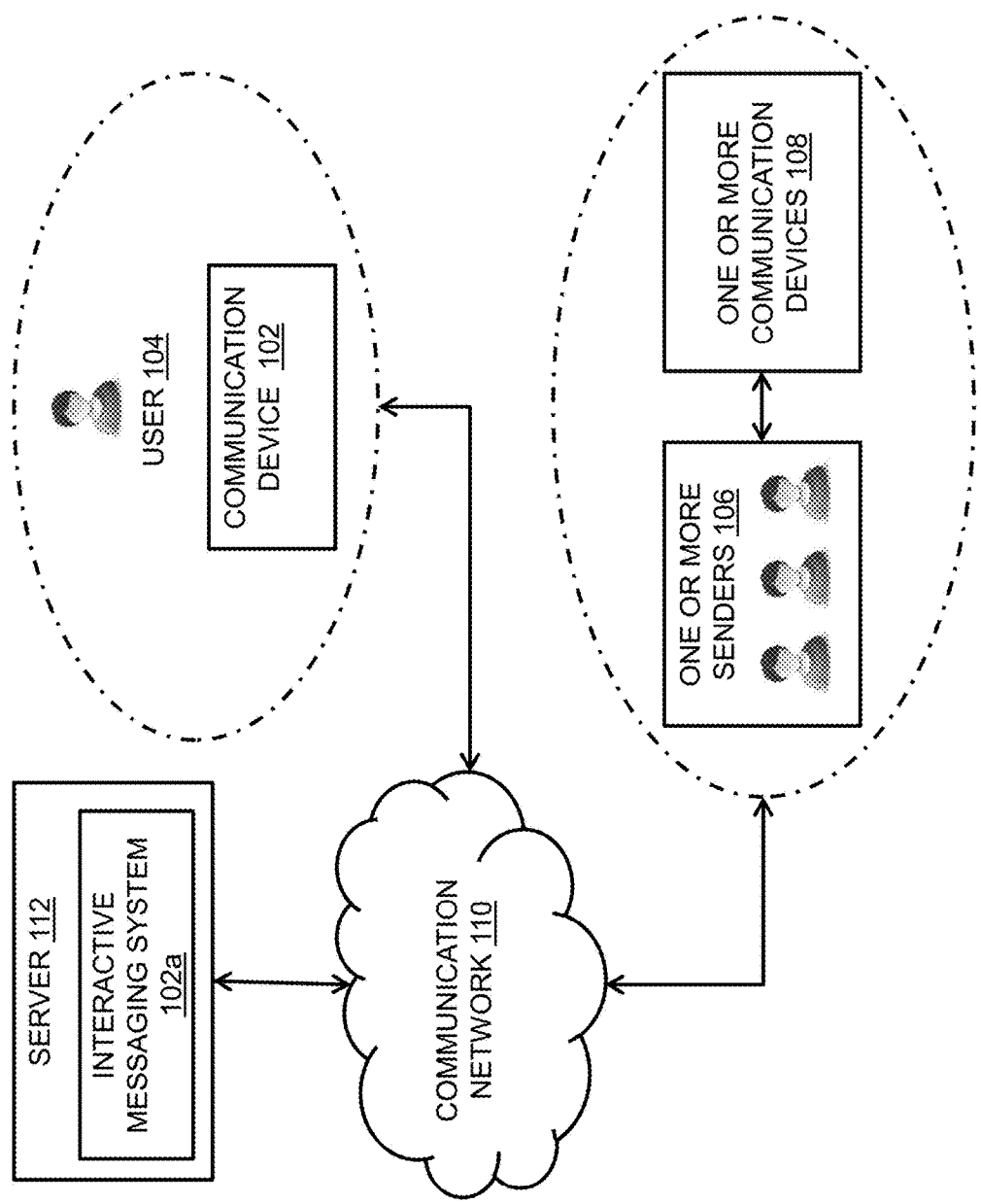
Figure 2:
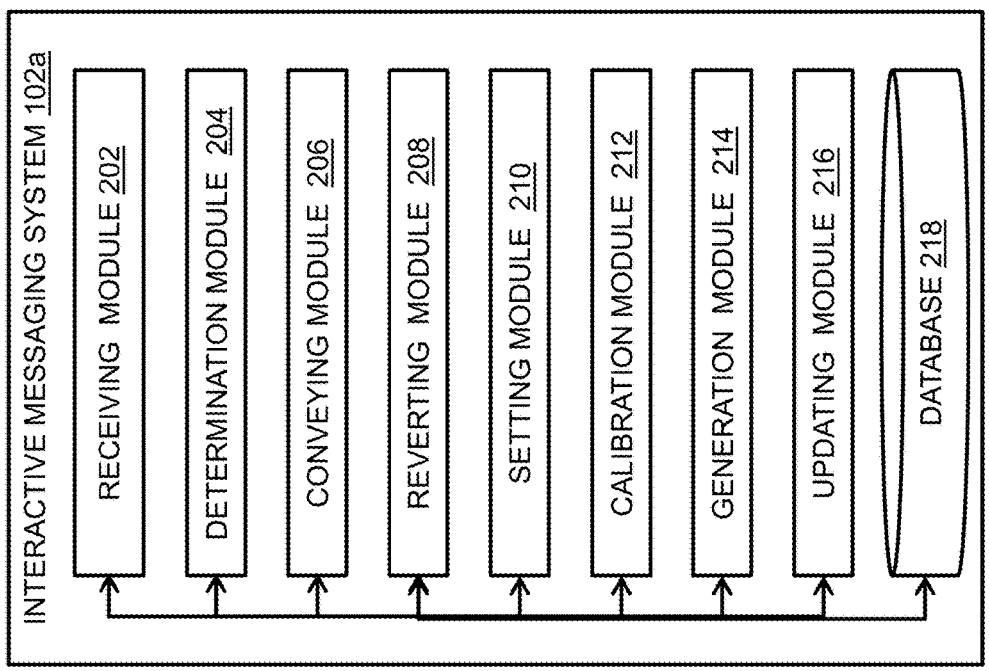
Figure 3:
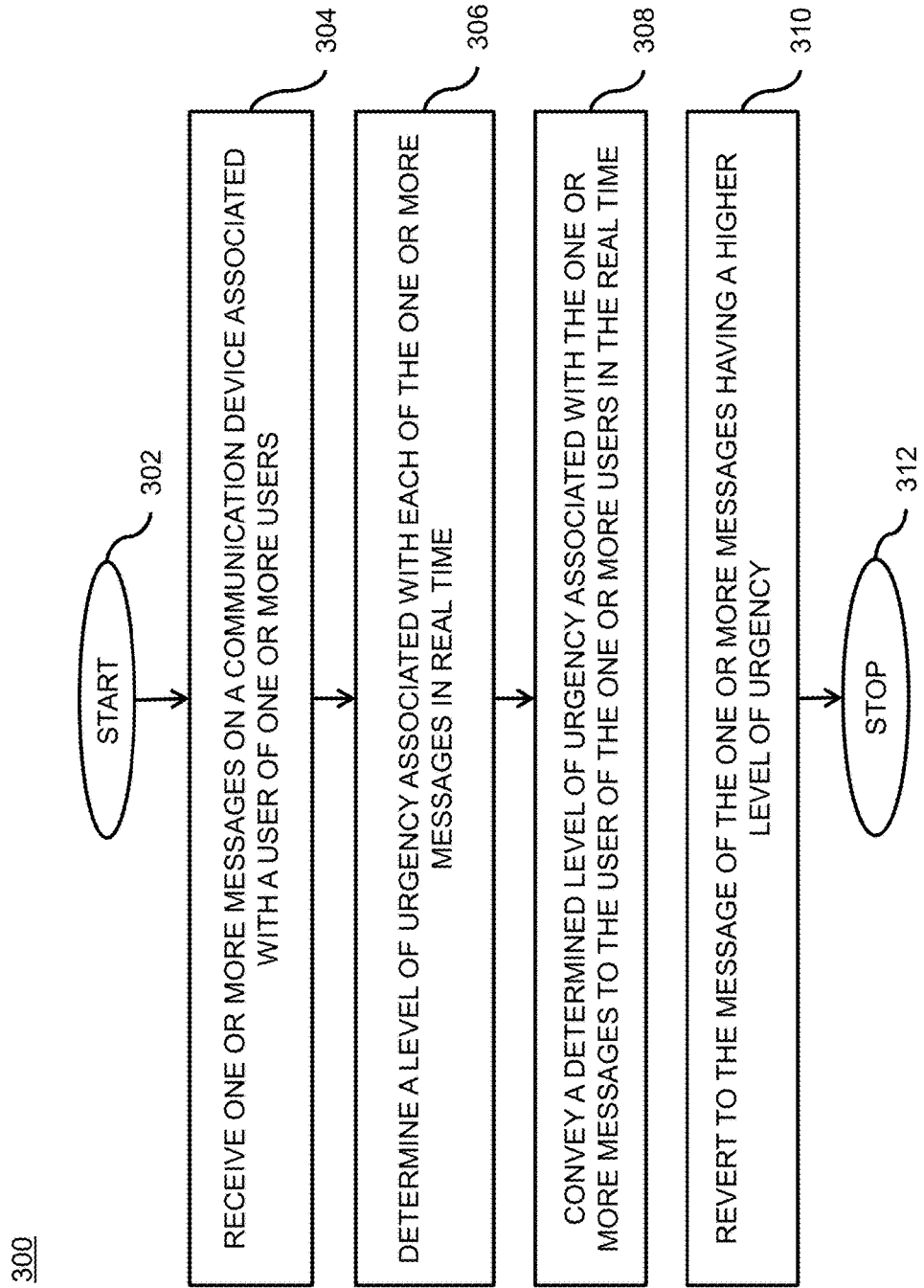
Figure 4:
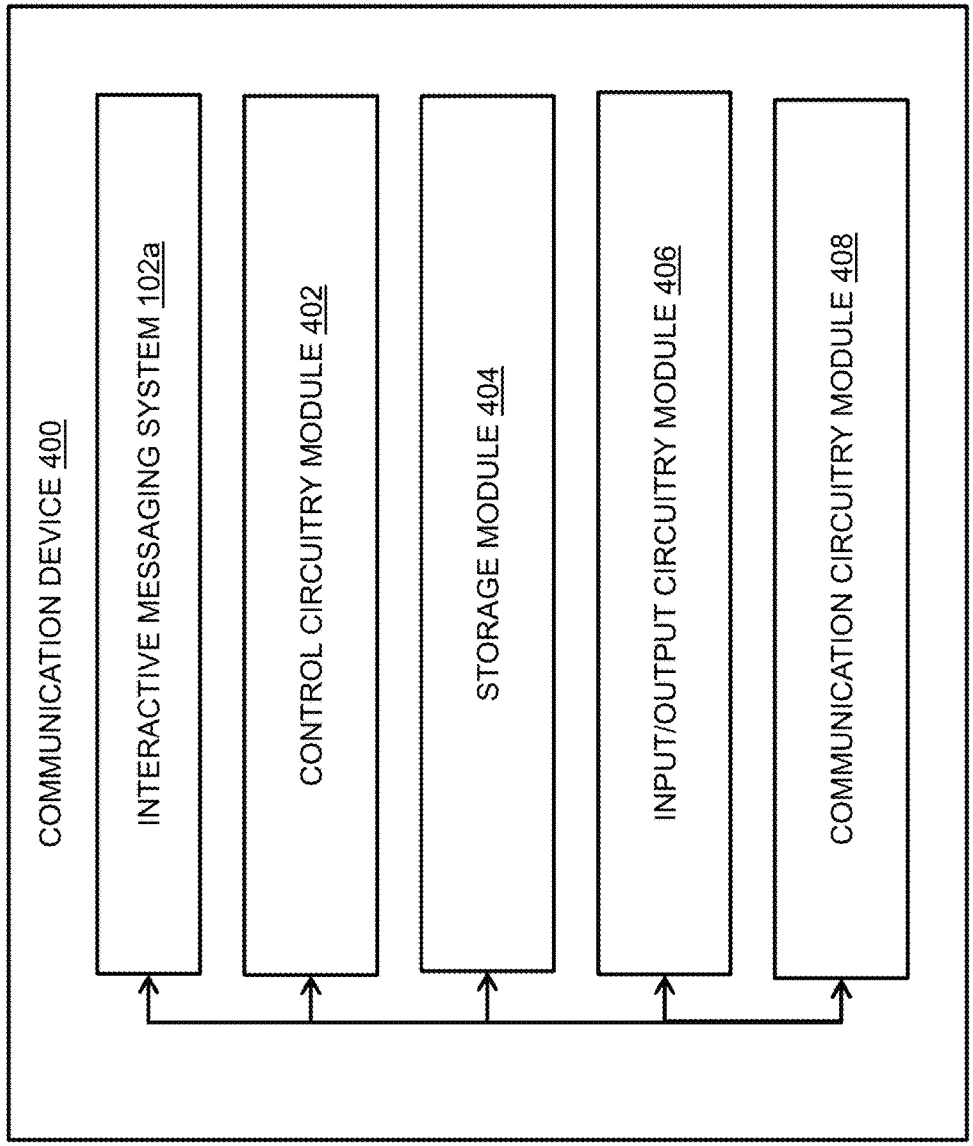

Having thus described the invention in general terms, reference will now be made to the accompanying drawings, which are not necessarily drawn to scale, and wherein:

FIG. 1A illustrates an interaction between one or more users for an active messaging session, in accordance with an embodiment of the present disclosure;

FIG. 1B illustrates an interaction between the one or more users for the active messaging session, in accordance with another embodiment of the present disclosure;

FIG. 2 illustrates a block diagram of an interactive messaging system, in accordance with various embodiment of the present disclosure;

FIG. 3 illustrates a flowchart for providing hands-free conversation between the one or more users through the one or more messages, in accordance with various embodiments of the present disclosure; and FIG. 4 illustrates a block diagram of a communication device, in accordance with various embodiments of the present disclosure.

It should be noted that the accompanying figures are intended to present illustrations of exemplary embodiments of the present disclosure. These figures are not intended to limit the scope of the present disclosure. It should also be noted that accompanying figures are not necessarily drawn to scale.

DETAILED DESCRIPTION

Reference will now be made in detail to selected embodiments of the present disclosure in conjunction with accompanying figures. The embodiments described herein are not intended to limit the scope of the disclosure, and the present disclosure should not be construed as limited to the embodiments described. This disclosure may be embodied in different forms without departing from the scope and spirit of the disclosure. It should be understood that the accompanying figures are intended and provided to illustrate embodiments of the disclosure described below and are not necessarily drawn to scale. In the drawings, like numbers refer to like elements throughout, and thicknesses and dimensions of some components may be exaggerated for providing better clarity and ease of understanding.

It should be noted that the terms "first", "second", and the like, herein do not denote any order, quantity, or importance, but rather are used to distinguish one element from another. Further, the terms "a" and "an" herein do not denote a limitation of quantity, but rather denote the presence of at least one of the referenced item.

FIG. 1A illustrates an interaction between one or more users for an active messaging session, in accordance with an embodiment of the present disclosure. The interaction between the one or more users is associated with a communication device 102, one or more communication devices 108, a communication network 110 and a server 112. In addition, the communication device 102 is associated with a user 104 and the one or more communication devices 108 are associated with one or more senders 106. The above setup provides hands free messaging between one or more users.

Further, the communication device 102 and the user 104 are present in a specific environment. The communication device 102 may be any communication device connected to the communication network 110. In an embodiment of the present disclosure, the communication device 102 is a mobile phone. In another embodiment of the present disclosure, the communication device 102 is a tablet. In yet another embodiment of the present disclosure, the communication device 102 is a laptop. In yet another embodiment of the present disclosure, the communication device 102 is a personal digital assistant (hereinafter "PDA"). In addition, the communication device may be any portable or fixed communication device.

In an embodiment of the present disclosure, the communication device 102 is in physical contact with the user 104. In another embodiment of the present disclosure, the communication device 102 is present in a close vicinity of the user 104. Further, the user 104 and the communication device 102 may be present in any suitable environment. Examples of the suitable environment includes but may not be limited to a highway, a parking lot, a hotel room, an office, a mall, a hospital, an airport and a bathroom. In an embodiment of the present disclosure, the user 104 physically interacts with the communication device 102. In another embodiment of the present disclosure, the user 104 visually interacts with the communication device 102. In yet another embodiment of the present disclosure, the user 104 verbally interacts (speech or audio) with the communication device 102. In yet another embodiment of the present disclosure, the user 104 may interact through any combination of physical, visual and verbal interaction.

The communication device 102 includes a vibration device, one or more audio emitting sources, a multicolor screen, a global positioning system (hereinafter "GPS"), a networking device, one or more microphones. In an embodiment of the present disclosure, the communication device 102 is a portable communication device. In another embodiment of the present disclosure, the communication device 102 is fixed communication device. Further, the vibration device is an electronic vibrator that vibrates based on instructions from the processor. In addition, one or more audio emitting sources include inbuilt speakers, Bluetooth speakers and peripheral speakers. The audio emitting sources generate sound based on audio or speech input provided by the communication device 102.

Moreover, the multicolor screen is a display screen designed to display the one or more messages through text, video or images. In an embodiment of the present disclosure, the multicolor screen is a capacitive touch screen. In another embodiment of the present disclosure, the multicolor screen is a resistive touch screen. In yet another embodiment of the present disclosure, the multicolor screen is a touch insensitive screen. Furthermore, the GPS in the communication device 102 provides latitude and a longitude of the user 104 and an exact time. The latitude, the longitude and the exact time is used to map an exact physical location of the user 104. Furthermore, the networking device in the communication device 102 may be any device designed to connect to the communication network 110. In an embodiment of the present disclosure, the networking device is a global system for mobile communication (hereinafter "GSM"). In another embodiment of the present disclosure, the networking device is a code division multiple access (hereinafter "CDMA").

Furthermore, the one or more microphones are designed to take speech or sound pattern as input for further processing in the communication device 102. Each of the one or more microphones operates synchronously to cancel any surrounding noise. In an embodiment of the present disclosure, the communication device 102 includes an interactive messaging system 102a. In another embodiment of the present disclosure, the server 112 includes the interactive messaging system 102a (as shown in FIG. 1B). Furthermore, the one or more messages may be a short message service (hereinafter "SMS"), a push notification, an electronic mail, a voice mail, a multimedia message (hereinafter "MMS"), a social networking app message and the like. In an embodiment of the present disclosure, the communication device 102 receives messages from the one or more senders 106. In another embodiment of the present disclosure, the communication device 102 receives one or more messages auto-generated from a machine. For example, the one or more messages auto-generated from the machine includes a bank statement, a transaction statement, a ticket booking alert, a travel schedule alert and the like.

Furthermore, the user 104 maintains a contact list accessible to the interactive messaging system 102a. The contact list includes digital contact identity of the one or more senders 106. In an embodiment of the present disclosure, the digital contact identity is a 10 or more digit mobile number. In another embodiment of the present disclosure, the digital contact identity is an email address. In yet another embodiment of the present disclosure, the digital contact identity is a virtual contact number. In yet another embodiment of the present disclosure, the digital contact identity is a social media contact. Each of the one or more senders 106 is uniquely identified by the digital contact identity.

Moreover, the communication device 102 runs on an operating system (OS). The OS is installed in a storage space of the communication device 102. In an embodiment of the present disclosure, the OS is an android OS. In another embodiment of the present disclosure, the OS is a BADA OS. In yet another embodiment of the present disclosure, the OS is a Symbian OS. In yet another embodiment of the present disclosure, the OS is an apple iOS. The operating system provides a calling interface, a texting interface, an audio and video playing interface, a physical location tracking interface and the like.

Further, the interactive messaging system 102a performs a real time check of the one or more messages received in a pre-determined operating duration of day. The interactive messaging system 102a receives the one or more messages on the communication device 102 associated with the user 104 of the one or more users. The one or more messages are received in the real time. In addition, the interactive messaging system 102a receives the one or more messages from the one or more communication devices 108. The one or more communication devices 108 are associated with the one or more senders 106. In addition, the interactive messaging system 102a receives the one or more messages from the one or more communication devices 108 through the communication network 110. In an embodiment of the present disclosure, the communication network 110 is an internet based network. In another embodiment of the present disclosure, the communication network 110 is a telecom operator network. In yet another embodiment of the present disclosure, the communication network 110 is a local area network.

The interactive messaging system 102a determines a level of urgency associated with each of the one or more messages in the real time. The level of urgency is determined from an analysis of each of the one or more messages. The analysis is done based on a mining of sentiments associated with each of the one or more message and a user profile associated with the user 104 of the one or more users. The user profile is based on a plurality of parameters. The plurality of parameters includes a past interaction of the user 104 of the one or more users with a corresponding sender of the one or more senders 106 and a past interaction of the user 104 with the one or more senders 106. Moreover, the plurality of parameters includes a preference setting of the user 104 of the one or more users and a number of messages associated with each corresponding sender of the one or more senders 106. In addition, the plurality of parameters includes duration of messaging associated with each of the corresponding sender of the one or more senders 106 and a time period of a conversation with each corresponding sender of the one or more senders 106. Also, the plurality of parameters includes an identity of a sender, a mapping of trigger words and a variation in typing the one or more messages.

In addition, the interactive messaging system 102a mines sentiments from an extraction, sample and comparison of a speech tone, a mapping of keywords in each of the one or more messages with known keywords (related to urgency) in a database present in the storage space. Further, the interactive messaging system 102a develops the user profile in the database present in the storage space. Further, the sentiments of the user 104 include cry, laughter, anger, pain and shock. In an example, a user (say, X) is driving a car. The user (X) receives a message from his spouse regarding any emergency medical condition. The user (X) cannot access his communication device 102. The user (X) speaks "call 911 to home". The interactive messaging system 102a converts the audio into text and maps "911" to one of the keywords present in the database. Upon matching of the condition as a medical emergency, the interactive messaging system 102a sends one or more messages to the required recipient. In addition, the interactive messaging system 102a may interpret the speech tone of the user (X).

In another example, the user 104 is present in a movie hall. The user 104 may not hear any alert tone from any message. In addition, the user 104 may be ignorant towards unimportant messages. Upon reception of the urgent message, the interactive messaging system 102a maps the keywords of the messages or mines the context of the message and flags the message as urgent. The interactive messaging system 102a sets a particular vibration pattern knows to the user 104. The user 104 may immediately respond to the particular vibration pattern. In general, the particular vibration pattern is a type of a haptic feedback.

Furthermore, the interactive messaging system 102a sets a priority level associated with each of the one or more received messages. The priority level is set based on the determined level of urgency. The priority level is set by ordering, ranking and filtering the one or more messages and the one or more users based on the level of urgency. In addition, the interactive messaging system 102a determining one or more behavioral attributes of one or more users. The one or more behavioral attributes includes a measure of urgency for the user and a frequency of sending of urgent messages of the one or more messages. The one or more behavioral attributes are presented before the user 104 to manually rank and filter messages and the one or more users. In an embodiment of the present disclosure, the user 104 manually sets a priority list of senders in the preference setting. In another embodiment of the present disclosure, the user sets the priority list of senders in the preference setting based on results from sentiment mining through machine learning based approach. The machine learning based approach is performed through regressive data mining of user 104 sentiments.

In an example, the user (G) receives messages from a first sender (H) and a second sender (M). The first sender (H) sends non-urgent messages having urgent keywords frequently and the second sender (M) sends messages actually urgent to the user. The interactive messaging system will mine the level of urgency by sentiment mining of frequency of sent messages having urgent keywords and personal preference set by the user. The user can limit the number of urgent messages from the first sender (H) and prioritize the messages from the sender (M).

The interactive messaging system 102a conveys the determined level of urgency associated with the one or more messages to the user 104 of the one or more users in the real time. The conveying of the determined level of urgency is done to prompt the user 104 about the message of the one or more messages having a higher level of urgency. The conveying of the determined level of urgency is done based on the analysis of the one or more messages. The level of urgency is conveyed through a first plurality of techniques. The first plurality of techniques includes an increase in frequency of the one or more vibratory pulses and an increase in amplitude of the one or more vibratory pulses. Moreover, the first plurality of techniques includes a range of vibration patterns set by the user 104 of the one or more users in the preference settings, a color coded pattern, one or more audio feedbacks, one or more haptic feedbacks and a text to speech feedback. In addition, the color coded pattern is based on a pattern of hue, saturation and color of text in each of the one or more messages.

Further, the interactive messaging system 102a may mine sentiments from boldfacing, capitalization and punctuation in the determination of the tone of the message. Accordingly, the interactive messaging system 102a may alert the user 104 of the urgency of the one or more messages.

In an example, a user (B) is travelling in the car. The interactive messaging system 102a receives the urgent message from the one or more senders 106. In addition, the user (B) is not physically in contact with the communication device 102. The interactive messaging system 102a in the communication device 102 may show the color coded pattern or an audio version of a corresponding urgent message. In another example, the user (B) may be present in a meeting. The user (B) has put his communication device 102 in silent mode. Upon reception of the urgent message, the interactive messaging system 102a converts the text in the urgent message to speech.

In addition, the interactive messaging system 102a regularly monitors the variation in varying priority of messages from the one or more users. Further, the interactive messaging system 102a calibrates the user profile based on monitoring the real time variation in the plurality of parameters. The calibration of the user profile involves an edit of priority and urgency requirements.

Furthermore, the user 104 reverts to the corresponding received message from the one or more senders 106. In a scenario, the user 104 is not in physical contact with the communication device 102. Accordingly, the interactive messaging system 102a reverts to the message of the one or more messages having the higher level of urgency. The reverting of the one or more messages is done based on a preference set by the user 104. The reverting of the one or more messages is done through a second plurality of techniques. The second plurality of techniques includes a speech to text feedback, a speech based message editing and scrolling, a face gesture based sentiment recognition, a speech tone based sentiment recognition and a mapping of keywords in the text converted from the speech to the text. In addition, the interactive messaging system 102a will automatically add one or more punctuation marks based on the sentiment mining of tone of the speech.

In an example, the interactive messaging system 102a alters text from the speech conversion based upon the tone of the message when the message is dictated by the user 104 to the communication device 102. The interactive messaging system 102a may capitalize and add punctuation based upon the tone detected. If the tone of the user is angry, then the trigger words may be capitalized or boldfaced. Similarly, if the tone is one of excitement, then exclamation marks may be added.

In another scenario, the user 104 is in an active message session with the one or more senders 106. The battery of the user 104 is below a prescribed level. The interactive messaging system 102a generates a speech processing based auto response and an auto notification of relevant device measurements. The auto response and the auto notification of the relevant device measurements include a low battery charge, a low internet data, low signal strength and the like. Further, the interactive messaging system 102a updates the plurality of parameters associated with the user 104 and the user profile in the database. In addition, the interactive messaging system 102a updates in the real time.

It may be noted that in FIG. 1A and FIG. 1B, the user 104 is associated with the communication device 102; however, those skilled in the art would appreciate that the user 104 is associated with more number of communication devices. Moreover, it may be noted that in FIG. 1A and FIG. 1B, the communication device 102 is connected to the one or more senders 106 through the communication network 110; however, those skilled in the art would appreciate that the communication device 102 is connected to more number of communication networks 110 simultaneously.

FIG. 2 illustrates a block diagram 200 of the interactive messaging system 102a, in accordance with various embodiments of the present disclosure. It may be noted that to explain the system elements of the FIG. 2, references will be made to the system elements of the FIG. 1. The interactive messaging system 102a provides the hands free active messaging session between the one or more users. In addition, the interactive messaging system 102a enables the user 104 to provide response to messages of the one or more messages with a higher level of urgency in real time (as stated above in the detailed description of the FIG. 1A and FIG. 1B).

Going further, the block diagram 200 illustrates a plurality of components of the interactive messaging system 102a. The plurality of components of the interactive messaging system 102a include a receiving module 202, a determination module 204, a conveying module 206, a reverting module 208, a setting module 210, a calibration module 212, a generation module 214, an updating module 216 and a database 218. The above stated components of the interactive messaging system 102a enable the hands-free conversation between the one or more users.

The interactive messaging system 102a is associated with the communication device 102 of the user 104 (as described above in the detailed description of the FIG. 1A). In an embodiment of the present disclosure, the interactive messaging system 102a is associated with the server 112 (as mentioned above in the detailed description of the FIG. 1B). The server 112 controls each and every operation performed by the interactive messaging system 102a. In an embodiment of the present disclosure, the interactive messaging system 102a is associated with the software application installed on the communication device 102. The software application runs in the background of the communication device 102.

Further, the software application enables the user 104 to optimize the preference settings. The preference settings allow the user 104 to store a list of people who have a higher priority level than other users in case of any emergency. In an embodiment of the present disclosure, the user 104 sets his/her preferences related to messages of which users are important than others (as stated above in the detailed description of the FIG. 1A and FIG. 1B). Furthermore, the one or more senders 106 send the one or more messages through the corresponding one or more communication devices 108 in real time.

Furthermore, the receiving module 202 of the interactive messaging system 102a receives the one or more messages on the communication device 102 associated with the user 104 of the one or more users. The one or more messages are received through the communication network 110 (as stated above in the detailed description of the FIG. 1A). Also, the one or more messages are sent by the one or more senders 106 through the corresponding one or more communication devices 108. In an embodiment of the present disclosure, the communication device 102 receives a single message from a sender of the one or more senders 106. In another embodiment of the present disclosure, the communication device 102 receives more than one message from the sender of the one or more senders 106. In yet another embodiment of the present disclosure, the communication device 102 receives a plurality of messages from a corresponding plurality of senders in real time.

The one or more messages are received on any messaging software application installed on the communication device 102. Further, the determination module 204 of the interactive messaging system 102a determines the level of urgency associated with each of the received one or more messages in real time. Furthermore, the level of urgency is determined from the analysis of each of one or more received messages. The analysis of each of the one or more received messages is done based on the mining of sentiments associated with each of the one or more messages. In addition, the analysis of each of the one or more received messages is done based on the user profile associated with the user 104 of the one or more users (as discussed above in the detailed description of the FIG. 1A and FIG. 1B).

The user profile is based on the plurality of parameters. The plurality of parameters include the plurality of parameters includes the past interaction of the user 104 of the one or more users with the corresponding sender and the past interaction of the user 104 with the group of senders. Further, the plurality of parameters includes the preference settings of the user 104 of the one or more users and the number of messages associated with each corresponding sender. Furthermore, the plurality of parameters includes the duration of messaging associated with each of the corresponding sender. In addition, the plurality of parameters includes the time period associated with the conversation with each of the corresponding sender, the identity of the sender, the mapping of the trigger words and the variation in typing (as mentioned above in the detailed description of the FIG. 1A and FIG. 1B).

Going further, conveying module 206 of the interactive messaging system 102a conveys the determined level of urgency associated with the one or more messages to the user 104 of the one or more users in real time. Moreover, the conveying of the determined level of urgency is done to prompt the user 104 about the message of the one or more messages having the highest level of urgency. The conveying of the determined level of urgency is done based on the analysis of the one or more messages. Also, the level of urgency is conveyed through the first plurality of techniques.

The first plurality of techniques includes the increase in the frequency of one or more vibratory pulses and the increase in the amplitude of the one or more vibratory pulses. In addition, the first plurality of techniques includes the range of vibration patterns set by the user 104 of the one or more users in the preference settings, the color coded pattern, the one or more haptic feedbacks and the text to speech feedback (as mentioned above in the detailed description of the FIG. 1A and FIG. 1B).

Further, the reverting module 208 of the interactive messaging system 102a reverts to the message of the one or more messages having the highest level of urgency. Further, the reverting to the message of the one or more messages having the high level of urgency is done based on the preference set by the user 104. The reverting to the message of the one or more messages is done through the second plurality of techniques. The second plurality of techniques includes the speech to text feedback, the speech based message editing and scrolling, a face gesture based sentiment recognition and a speech tone based sentiment recognition. In addition, the second plurality of techniques includes the mapping of keywords in the text converted from the speech to the text (as discussed above in the detailed description of the FIG. 1A and FIG. 1B).

In an embodiment of the present disclosure, the setting module 210 of the interactive messaging system 102a sets the priority level associated with each of the one or more received messages. The priority level is set based on the determined level of urgency. The priority is set by ordering, ranking and filtering the one or more messages and the one or more users based on the level of urgency (as described above in the detailed description of the FIG. 1A and FIG. 1B). In addition, the calibration module 212 of the interactive messaging system 102a calibrates the user profile associated with the user 104. The calibration of the user profile is based on monitoring the real time variation in the plurality of parameters (as stated above in the detailed description of the FIG. 1A and FIG. 1B).

Further, the generation module 214 of the interactive messaging system 102a generates the speech processing based auto response and the auto notification of the relevant device measurements (as discussed above in the detailed description of the FIG. 1A and FIG. 1B). In addition, the updating module 216 of the interactive messaging system 102a updates the plurality of parameters associated with the user 104 and the user profile. The update is done in real time (as mentioned above in the detailed description of the FIG. 1A and FIG. 1B). Furthermore, the database 218 of the interactive messaging system 102a stores the user profile associated with the user 104, the plurality of parameters, the received one or more messages, the determined level of urgency and the revert by the user 104.

FIG. 3 illustrates a flowchart 300 for providing hands-free conversation between the one or more users through the one or more messages, in accordance with various embodiments of the present disclosure. It may be noted that to explain the process steps of the flowchart 300, references will be made to the interactive messaging system elements of the FIG. 1A, FIG. 1B and FIG. 2.

The flowchart 300 initiates at step 302. At step 304, the receiving module 202 receives the one or more messages on the communication device 102. The communication device 102 is associated with the user 104 of the one or more users. Further, at step 306, the determination module determines a level of urgency associated with each of the one or more messages in the real time. The level of urgency is associated with each of received one or more messages in the real time. Furthermore, the level of urgency is determined from the analysis of each of one or more received messages. The analysis of each of the one or more received messages is done based on the mining of sentiments associated with each of the one or more messages. Moreover, at step 308, the conveying module 206 conveys the determined level of urgency. The determined level of urgency is associated with the one or more messages of the user 104 of the one or more users in the real time. In addition, at step 310, the reverting module reverts to the message of the one or more messages having the highest level of urgency. The flow chart 300 terminates at step 312.

It may be noted that the flowchart 300 is explained to have above stated process steps; however, those skilled in the art would appreciate that the flowchart 300 may have more/less number of process steps which may enable all the above stated embodiments of the present disclosure.

FIG. 4 illustrates a block diagram of a communication device 400, in accordance with various embodiments of the present disclosure. The communication device 400 enables host process of the interactive messaging system 102a. The communication device 400 includes a control circuitry module 402, a storage module 404, an input/output circuitry module 406, and a communication circuitry module 408. The communication device 400 includes any suitable type of portable electronic device. The communication device 400 includes but may not be limited to a personal e-mail device (e.g., a Blackberry™ made available by Research in Motion of Waterloo, Ontario), a personal data assistant ("PDA"), a cellular telephone. In addition, the communication device 400 includes a smartphone, the laptop, computer and the tablet. In another embodiment of the present disclosure, the communication device 400 can be a desktop computer.

From the perspective of this disclosure, the control circuitry module 402 includes any processing circuitry or processor operative to control the operations and performance of the communication device 400. For example, the control circuitry module 402 may be used to run operating system applications, firmware applications, media playback applications, media editing applications, or any other application.

In an embodiment of the present disclosure, the control circuitry module 402 drives a display and process inputs received from the user interface. From the perspective of this disclosure, the storage module 404 includes one or more storage mediums. The one or more storage medium includes a hard-drive, solid state drive, flash memory, permanent memory such as ROM, any other suitable type of storage component, or any combination thereof. The storage module 404 may store, for example, media data (e.g., music and video files), application data (e.g., for implementing functions on the communication device 400).

From the perspective of this disclosure, the I/O circuitry module 406 may be operative to convert (and encode/decode, if necessary) analog signals and other signals into digital data. In an embodiment of the present disclosure, the I/O circuitry module 406 may convert the digital data into any other type of signal and vice-versa. For example, the I/O circuitry module 406 may receive and convert physical contact inputs (e.g., from a multi-touch screen), physical movements (e.g., from a mouse or sensor), analog audio signals (e.g., from a microphone), or any other input. The digital data may be provided to and received from the control circuitry module 402, the storage module 404, or any other component of the communication device 400.

It may be noted that the I/O circuitry module 406 is illustrated in FIG. 4 as a single component of the communication device 400; however those skilled in the art would appreciate that several instances of the I/O circuitry module 406 may be included in the communication device 400.

The communication device 400 may include any suitable interface or component for allowing the user to provide inputs to the I/O circuitry module 406. The communication device 400 may include any suitable input mechanism. Examples of the input mechanism include but may not be limited to a button, keypad, dial, a click wheel, and a touch screen. In an embodiment, the communication device 400 may include a capacitive sensing mechanism, or a multi-touch capacitive sensing mechanism.

In an embodiment of the present disclosure, the communication device 400 may include specialized output circuitry associated with output devices such as, for example, one or more audio outputs. The audio output may include one or more speakers built into the communication device 400, or an audio component that may be remotely coupled to the communication device 400.

The one or more speakers can be mono speakers, stereo speakers, or a combination of both. The audio component can be a headset, headphones or ear buds that may be coupled to the communication device 400 with a wire or wirelessly.

In an embodiment, the I/O circuitry module 406 may include display circuitry for providing a display visible to a user. For example, the display circuitry may include a screen (e.g., an LCD screen) that is incorporated in the communication device 400.

The display circuitry may include a movable display or a projecting system for providing a display of content on a surface remote from the communication device 400 (e.g., a video projector). In an embodiment of the present disclosure, the display circuitry may include a coder/decoder to convert digital media data into the analog signals. For example, the display circuitry may include video Codecs, audio Codecs, or any other suitable type of Codec.

The display circuitry may include display driver circuitry, circuitry for driving display drivers or both. The display circuitry may be operative to display content. The display content can include media playback information, application screens for applications implemented on the electronic device, information regarding ongoing communications operations, information regarding incoming communications requests, or device operation screens under the direction of the control circuitry module 402. Alternatively, the display circuitry may be operative to provide instructions to a remote display.

In addition, the communication device 400 includes the communication circuitry module 408. The communication circuitry module 408 may include any suitable communication circuitry operative to connect to a communication network. In addition, the communication circuitry module 408 may include any suitable communication circuitry to transmit communications (e.g., voice or data) from the communication device 400 to other devices. The other devices exist within the communications network. The communications circuitry 408 may be operative to interface with the communication network through any suitable communication protocol. Examples of the communication protocol include but may not be limited to Wi-Fi, Bluetooth®, radio frequency systems, infrared, LTE, GSM, GSM plus EDGE, CDMA, and quadband.

In an embodiment, the communications circuitry module 408 may be operative to create a communications network using any suitable communications protocol. For example, the communication circuitry module 408 may create a short-range communication network using a short-range communications protocol to connect to other devices. For example, the communication circuitry module 408 may be operative to create a local communication network using the Bluetooth® protocol to couple the communication device 400 with a Bluetooth,® headset.

It may be noted that the computing device is shown to have only one communication operation; however, those skilled in the art would appreciate that the communication device 400 may include one more instances of the communication circuitry module 408 for simultaneously performing several communication operations using different communication networks. For example, the communication device 400 may include a first instance of the communication circuitry module 408 for communicating over a cellular network, and a second instance of the communication circuitry module 408 for communicating over Wi-Fi or using Bluetooth®.

In an embodiment of the present disclosure, the same instance of the communications circuitry module 408 may be operative to provide for communications over several communication networks. In another embodiment of the present disclosure, the communication device 400 may be coupled to a host device for data transfers and sync of the communication device 400. In addition, the communication device 400 may be coupled to software or firmware updates to provide performance information to a remote source (e.g., to providing riding characteristics to a remote server) or performing any other suitable operation that may require the communication device 400 to be coupled to the host device. Several computing devices may be coupled to a single host device using the host device as a server. Alternatively or additionally, the communication device 400 may be coupled to the several host devices (e.g., for each of the plurality of the host devices to serve as a backup for data stored in the communication device 400).

The foregoing descriptions of specific embodiments of the present technology have been presented for purposes of illustration and description. They are not intended to be exhaustive or to limit the present technology to the precise forms disclosed, and obviously many modifications and variations are possible in light of the above teaching. The embodiments were chosen and described in order to best explain the principles of the present technology and its practical application, to thereby enable others skilled in the art to best utilize the present technology and various embodiments with various modifications as are suited to the particular use contemplated. It is understood that various omissions and substitutions of equivalents are contemplated as circumstance may suggest or render expedient, but such are intended to cover the application or implementation without departing from the spirit or scope of the claims of the present technology.

While several possible embodiments of the invention have been described above and illustrated in some cases, it should be interpreted and understood as to have been presented only by way of illustration and example, but not by limitation. Thus, the breadth and scope of a preferred embodiment should not be limited by any of the above-described exemplary embodiments.

What is claimed is:

1. A computer-implemented method for enabling conversation between a user and one or more other users through one or more messages, the computer-implemented method comprising:

receiving, by a processor, the one or more messages on a communication device associated with the user, wherein the one or more messages are received in real time by the communication device from one or more other communication devices;

accumulating a set of data in connection with the one or more messages;

determining, by the processor, a level of urgency associated with each of the one or more messages in real time, wherein the level of urgency is determined by analyzing each of the one or more messages, wherein the analyzing is done based on:

(a) mining of sentiments associated with each of the one or more messages, the mining of sentiments comprising analyzing a video contained by one or more of the messages, analyzing typing variations, analyzing speech of an audio recording contained by one or more of the messages, and of text mining for one or more sentiments of crying, laughter, anger, pain and shock;

(b) a current status of the user, wherein the current status of the user comprises a physical location of the user in real time, a rate of travel of the user, and a physical state of the user, and an emotional state of the user;

(c) a current status of the communication device, the current status comprising a battery power status, an amount of available data storage, a signal strength of the communication device, a current status of the communication device, comprising a number of programs in use, a number of applications open, and a number of messages waiting for a response from the user; and (d) a user profile associated with the user, wherein the user profile comprises past interactions of the user with the one or more other users, including a frequency, a duration, a sentiment, a location, and a time associated with each of the past interactions;

conveying, by the processor, a determined level of urgency associated with the one or more messages to the user in the real time, wherein the conveying is done for prompting the user about a message of the one or more messages having a higher level of urgency, wherein the conveying is done based on an analysis of the one or more messages and wherein the level of urgency is conveyed through a first plurality of techniques;

automatically responding, by the processor, to the message of the one or more messages having the higher level of urgency, wherein automatically responding is done based on a preference set by the user and wherein automatically responding is done through a second plurality of techniques; and setting, by the processor, a priority level associated with each of the one or more received messages, wherein the priority level is set based on the determined level of urgency and a frequency of sending urgent messages, wherein the priority is set by ordering, ranking and filtering the one or more messages and the one or more users based on the level of urgency and the frequency of sending of urgent messages.

2. The computer-implemented method as recited in claim 1, further comprising updating, by the processor, the set of data associated with the user and the user profile.

3. The computer-implemented method as recited in claim 1, further comprising calibrating, by the processor, the user profile based on monitoring a real time variation in the set of data.

4. The computer-implemented as recited in claim 1, further comprising generating, by the processor, a speech processing based auto response and an auto notification of relevant device measurements.

5. The computer-implemented method as recited in claim 1, wherein the past interactions of the user with the one or more other users of data comprises a past interaction of the user of the one or more users with a corresponding sender, a past interaction of the user with a group of senders, a preference settings of the user, a number of messages associated with each corresponding sender, a duration of messaging associated with each corresponding sender, a time period associated with a conversation with each corresponding sender, and an identity of each corresponding sender.

6. The computer-implemented method as recited in claim 1, wherein the one or more messages comprises one or more text messages, one or more e-mail messages, one or more audio messages, one or more video messages and one or more multimedia messages.

7. The computer-implemented method as recited in claim 1, wherein the first plurality of techniques comprises one or more frequency changes in one or more vibratory pulses, increase in amplitude of the one or more vibratory pulses, a range of vibration patterns in the preference set, a color coded pattern, one or more audio feedbacks, one or more haptic feedbacks and a text to speech feedback, wherein the range of vibration patterns is based on at least one of a user preference and a default configuration, and wherein the text to speech feedback comprises a portion of text from each of the one or more messages conveying urgency.

8. The computer-implemented method as recited in claim 7, wherein the color coded pattern is based on a pattern of hue, saturation and color of text in each of the one or more messages.

9. The computer-implemented method as recited in claim 1, wherein the second plurality of techniques comprises a speech to text feedback, a speech based message editing and scrolling, a face gesture based sentiment recognition, a speech tone based sentiment recognition and a mapping of keywords in a text converted from the speech to the text.

10. The method of claim 1 wherein automatically responding is performed based on a location of the user.

11. A computer program product comprising a non-transitory computer readable medium storing a computer readable program, wherein the computer readable program when executed on a computer causes the computer to perform steps comprising:

receiving one or more messages by a communication device associated with a user, wherein the one or more messages is received in real time and by the communication device from one or more other users of other communication devices;

accumulating a set of data in connection with the one or more messages;

determining a level of urgency associated with each of the one or more messages in real time, wherein the level of urgency is determined by analyzing each of the one or more messages, wherein the analyzing is done based on:

(a) mining of sentiments associated with each of the one or more messages, the mining of sentiments comprising analyzing a video contained by one or more of the messages, analyzing typing variations, analyzing speech of an audio recording contained by one or more of the messages, and of text mining for one or more sentiments of crying, laughter, anger, pain and shock;

(b) a current status of the user, wherein the current status of the user comprises a physical location of the user in real time, a rate of travel of the user, and a physical state of the user, and an emotional state of the user;

(c) a current status of the communication device, the current status comprising a battery power status, an amount of available data storage, a signal strength of the communication device, a current status of the communication device, comprising a number of programs in use, a number of applications open, and a number of messages waiting for a response from the user; and (d) a user profile associated with the user, wherein the user profile comprises past interactions of the user with the one or more other users, including a frequency, a duration, a sentiment, a location, and a time associated with each of the past interactions;

conveying a determined level of urgency associated with the one or more messages to the user in the real time, wherein the conveying is done for prompting the user about a message of the one or more messages having a higher level of urgency, wherein the conveying is done based on an analysis of the one or more messages and wherein the level of urgency is conveyed through a first plurality of techniques;

automatically responding to the message of the one or more messages having the higher level of urgency, wherein automatically responding is done based on a preference set by the user and wherein automatically responding is done through a second plurality of techniques; and setting, by the processor, a priority level associated with each of the one or more received messages, wherein the priority level is set based on the determined level of urgency and a frequency of sending urgent messages, wherein the priority is set by ordering, ranking and filtering the one or more messages and the one or more users based on the level of urgency and the frequency of sending of urgent messages.

12. The computer program product as recited in claim 11, wherein the computer readable program when executed on the computer causes the computer to perform a further step of updating the set of data associated with the user and the user profile.

13. The computer program product as recited in claim 11, wherein the computer readable program when executed on the computer causes the computer to perform a further step of calibrating the user profile based on monitoring a real time variation in the set of data.

14. The computer program product as recited in claim 11, wherein the computer readable program when executed on the computer causes the computer to perform a further step of generating a speech processing based auto response and an auto notification of relevant device measurements.

15. An interactive messaging system for enabling conversation between a user and one or more other users through one or more messages, the interactive messaging system comprising:
 a receiving module, the receiving module configured to receive the one or more messages by a communication device associated with the user, wherein the one or more messages is received in real time by the communication device from one or more other communication devices;
 an accumulating module in the processor, configured to accumulate a set of data in connection with the one or more messages;
 a determination module in the processor, the determination module configured to determine a level of urgency associated with each of the one or more messages in real time, wherein the level of urgency is determined by analyzing each of the one or more messages, wherein the analyzing is done based on:
 (a) mining of sentiments associated with each of the one or more messages, the mining of sentiments comprising analyzing a video contained by one or more of the messages, analyzing typing variations, analyzing speech of an audio recording contained by one or more of the messages, and of text mining for one or more sentiments of crying, laughter, anger, pain and shock;
 (b) a current status of the user, wherein the current status of the user comprises a physical location of the user in real time, a rate of travel of the user, and a physical state of the user, and an emotional state of the user;
 (c) a current status of the communication device, the current status comprising a battery power status, an amount of available data storage, a signal strength of the communication device, a current status of the communication device, comprising a number of programs in use, a number of applications open, and a number of messages waiting for a response from the user; and
 (d) a user profile associated with the user, wherein the user profile comprises past interactions of the user with the other users, including a frequency, a duration, a sentiment, a location, and a time associated with each of the past interactions;
 a conveying module in the processor, the conveying module configured to convey a determined level of urgency associated with the one or more messages to the user in the real time, wherein the conveying is done for prompting the user about a message of the one or more messages having a higher level of urgency, wherein the conveying being done is on an analysis of the one or more messages and wherein the level of urgency is conveyed through a first plurality of techniques;
 an auto-responding module in the processor, the auto-responding module configured to automatically respond to the message of the one or more messages having the higher level of urgency, wherein the auto-responding is done based on a preference set by the user and wherein the auto-responding is done through a second plurality of techniques; and
 a setting module, the setting module configured to set a priority level associated with each of the one or more received messages, wherein the priority level is set based on the determined level of urgency and a frequency of sending urgent messages, wherein the priority is set by ordering, ranking and filtering the one or more messages and the one or more users based on the level of urgency and the frequency of sending of urgent messages.

16. The interactive messaging system as recited in claim 15, further comprising an updating module in the processor, the updating module configured to update the set of data associated with the user and the user profile.

17. The interactive messaging system as recited in claim 15, further comprising a calibration module, the calibration module configured to calibrate the user profile based on monitoring a real time variation in the set of data, wherein the past interactions of the user with the one or more other users of data comprises a past interaction of the user with a corresponding sender, a past interaction of the user with a group of senders, a preference settings of the user, a number of messages associated with each corresponding sender, a duration of messaging associated with the corresponding sender, a time period associated with a conversation with the corresponding sender, and an identity of each corresponding sender.

18. The interactive messaging system as recited in claim 15, further comprising a generation module, the generation module configured to generate a speech processing based auto response and an auto notification of relevant device measurements.

* * * * *